United States Patent [19]

Uetani

[11] Patent Number: 4,672,531
[45] Date of Patent: * Jun. 9, 1987

[54] ELEVATOR SUPERVISORY LEARNING CONTROL APPARATUS

[75] Inventor: Kenichi Uetani, Aichi, Japan

[73] Assignee: Mitsubishi Denki Kabushiki Kaisha, Tokyo, Japan

[*] Notice: The portion of the term of this patent subsequent to Sep. 25, 2001 has been disclaimed.

[21] Appl. No.: 642,900

[22] Filed: Aug. 21, 1984

[30] Foreign Application Priority Data

Aug. 23, 1983 [JP] Japan ................................ 58-153750

[51] Int. Cl.⁴ ...................... G05B 15/02; G05B 13/02; G06F 15/14; B66B 1/00
[52] U.S. Cl. .................................... 364/138; 187/124; 364/424; 364/164
[58] Field of Search ................ 364/900, 138, 141, 143, 364/144, 164, 424, 200, 148, 436, 439; 187/29 R; 340/19 R, 20

[56] References Cited

U.S. PATENT DOCUMENTS

| | | |
|---|---|---|
| 4,411,338 | 10/1983 | Kuzunuki, I et al. ............ 187/29 R |
| 4,414,629 | 11/1983 | Waite ................................. 364/300 |
| 4,448,286 | 5/1984 | Kuzunuki, II et al. ........... 187/29 R |
| 4,458,787 | 7/1984 | Uetani . |
| 4,473,134 | 9/1984 | Uetani ............................... 187/29 R |
| 4,473,135 | 9/1984 | Yonemoto ........................ 187/29 R |
| 4,531,616 | 7/1985 | Uetani et al. ..................... 187/29 R |
| 4,536,842 | 8/1985 | Yoneda et al. .................. 364/164 X |
| 4,553,639 | 11/1985 | Uetani ............................... 187/29 R |
| 4,562,530 | 12/1985 | Umeda, II et al. ................ 364/148 |
| 4,567,558 | 1/1986 | Umeda et al. ..................... 364/148 |

FOREIGN PATENT DOCUMENTS

55-11556  6/1980  Japan .
57-62179  1/1982  Japan .

Primary Examiner—Joseph Ruggiero
Assistant Examiner—Jon D. Grossman
Attorney, Agent, or Firm—Leydig, Voit & Mayer

[57] ABSTRACT

An elevator supervisory-learning control apparatus for reliably predicting future elevator traffic on the basis of a learning function determined taking the statistics of past traffic conditions of an elevator over a predetermined past period of time. Future traffic is first estimated and the reliability of the estimated future traffic is calculated in accordance with the obtained learning function. Depending on the reliability level, a traffic pattern is selected so as to accurately and reliably predict future traffic of the elevator.

26 Claims, 9 Drawing Figures

ELEVATOR SUPERVISORY LEARNING CONTROL APPARATUS

BACKGROUND OF THE INVENTION

This invention relates to improvements in an apparatus which supervises the operation of a control elevator with a learning function.

Regarding the supervising operation of an elevator, there have heretofore been considered various measures in which future traffic are predicted on the basis of past traffic to control the elevator. For example, the simplest measure is such that at least one cage of the elevator is caused to wait at the ground level floor because the volume of traffic from this floor is usually large. To further reduce congestion, when this cage carries passengers to another floor, another cage is caused to stop at ground level. A similar measure is installed at any floor level having a similar traffic pattern. In a more complicated measure, a group supervisory control is carried out by calculating the estimated times at which a cage will reach respective floors, and then calculating the predictive waiting time intervals of hall calls at the respective floors.

Meanwhile, in recent years, supervision means called a "learning function", in which the statistics of elevator traffic conditions in the past are utilized to predict future traffic condition more precisely or a traffic of an elevator, has been proposed and two such proposals are disclosed in, e.g., the published Japanese Laid-open Patent Applications Nos. 55-115566 and 57-62179.

In view of the characteristics of the elevator traffic, however, the traffic predicted from the learning function is often inaccurate and inefficiently utilized. When the predicted traffic differs greatly from the actual traffic, call registration from users for requested floors is not serviced properly while services to other unrequested floors increase drastically due to allocation errors. On the other hand, when the predicted traffic based on the learning function agrees with the actual traffic, the overall service of the elevator is quickly enhanced. More specifically, erroneous detection of a traffic pattern is prevented when it is selected after some traffic jam has occurred, and rendered inactive upon lapse of a prescribed period of time. As a result, it is necessary to utilize the learning function for the supervision of the elevator in such a manner that erroneous prediction of future traffic is avoided.

SUMMARY OF THE INVENTION

This invention has for its object to provide an elevator supervisory learning control apparatus in which the reliability of predicted traffic traffic is calculated in accordance with the learning function and collected traffic conditions of a past predetermined time period so as to effectively and reliabily supervise the operation of the elevators.

PREFERRED EMBODIMENT OF THE INVENTION

Now, one embodiment of this invention will be described with reference to FIGS. 1-9.

Figure 1:
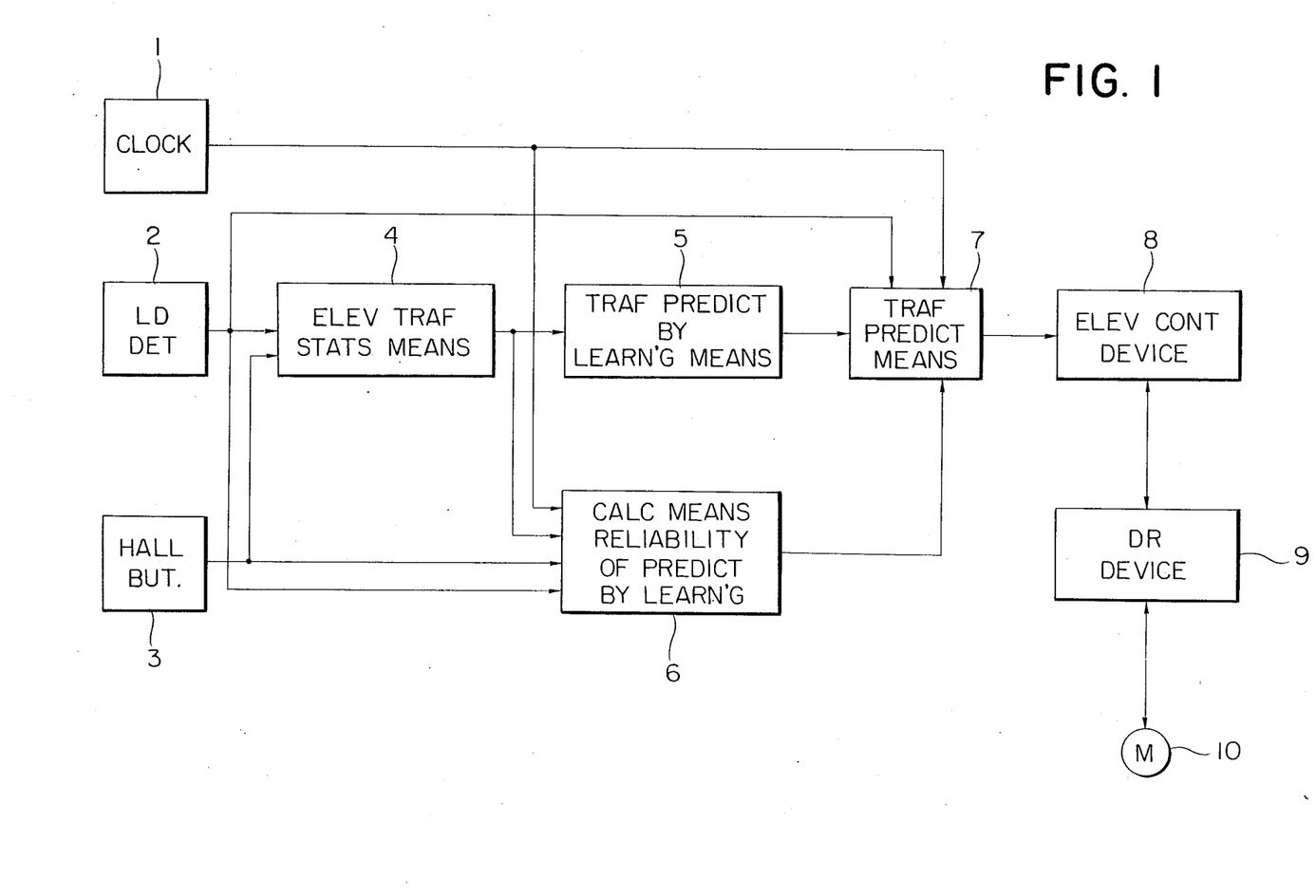
FIG. 1 is a general block diagram showing one embodiment of a supervisory apparatus for an elevator according to this invention.

In FIG. 1, numeral 1 designates a clock device which generates a clock signal every predetermined time zone, numeral 2 a load detector which detects a load in a cage, and numeral 3 a hall button which is located at each floor. On the basis of the outputs of these constituents and the running directions, positions etc. (not illustrated) of the cages which are other elevator traffic information items, elevator traffic statistics means 4 takes the statistical results of collected traffic conditions of an elevator for individual time zone over a predetermined time period to determine a learning function of the elevator traffic patterns. Using the learning function, means 5 estimates future traffic. On the other hand, means 6 calculates the reliability of the estimated traffic by the use of the outputs of the traffic statistics means 4, the clock 1, the load detector 2 and the hall buttons 3. Traffic prediction means 7 judges whether or not the predictive traffic result is applied, on the basis of the inputs from the learning traffic prediction means 5, the reliability calculating means 6, the clock 1 and the load detector 2 and the other elevator traffic information items (not illustrated). When it is judged that the predicted traffic result is inapplicable, the elevator traffic is predicted by another predetermined means. When it is judged that the predicted traffic result is applicable, this predicted traffic result is delivered in conformity with the reliablity. In accordance with such traffic prediction, an elevator control device 8 operates to drive a hoist motor 10 through a driving device 9 and to supervise the operation of the cage.

Figure 2:
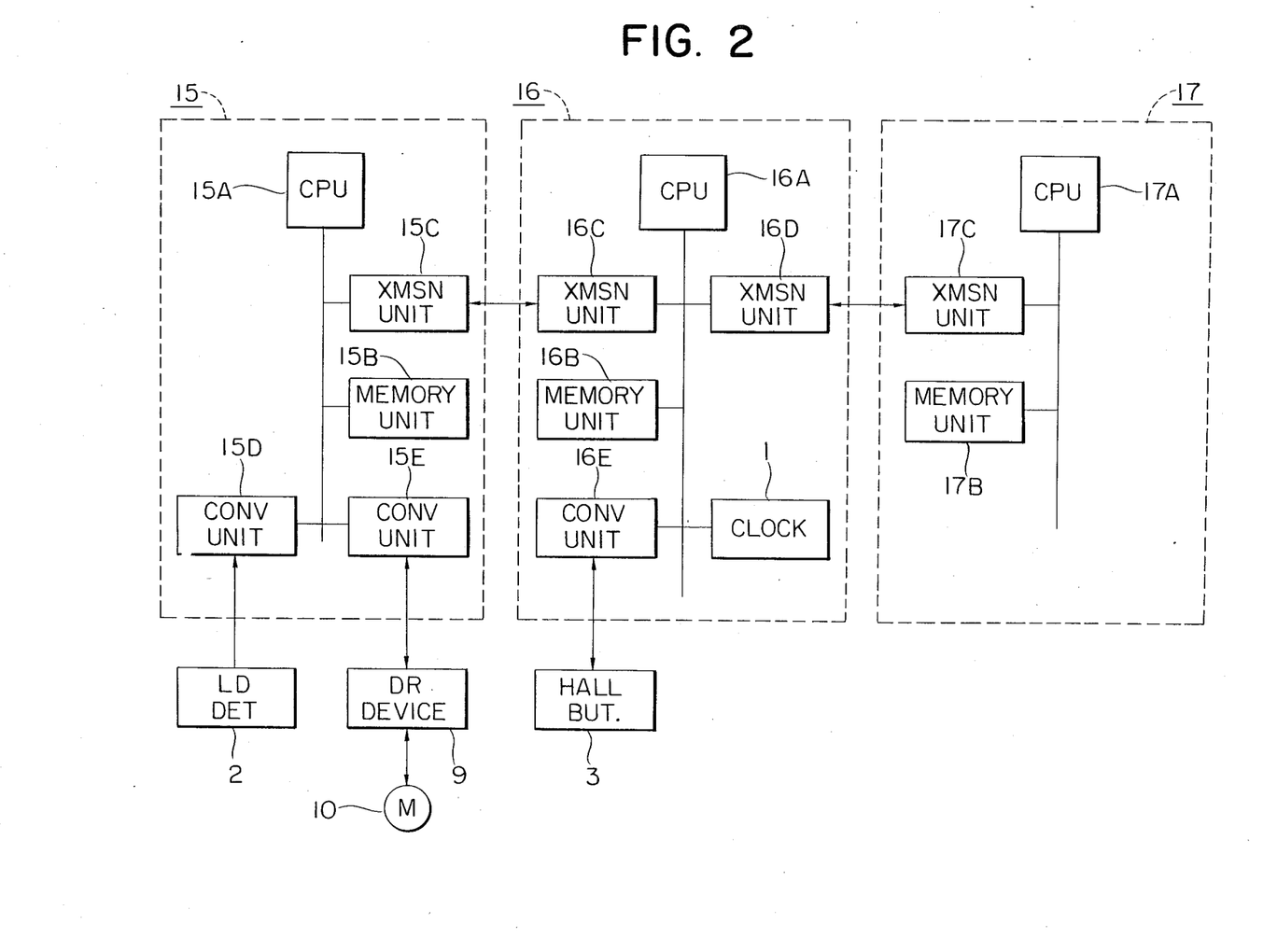
FIG. 2 is a block circuit diagram of the embodiment.

In FIG. 2, numeral 15 designates a cage control device similarly disclosed in the published Japanese Laid-open Patent Application No. 51-53354 by way of example. As shown, the control device is comprises a central processing unit (hereinbelow denoted by "CPU") 15A, a memory unit 15B which is composed of a read-only memory (hereinbelow denoted by "ROM") for storing programs and data of fixed values and a random access memory (hereinbelow denoted by "RAM") for temporarily storing data such as calculated results, a transmission unit 150 which sends and receives data, and conversion units 15D and 15E which are respectively connected to the load detector 2 and the driving device 9 and which convert input/output signal levels. Numeral 16 designates a group supervisory device which is also constructed of a microcomputer and similarly comprises a CPU 16A, a memory unit 16B, transmission units 16C and 16D, a conversion unit 16E connected to the hall button 3, and the clock 1. Numeral 17 designates a statistics device which is also constructed of a microcomputer and similarly comprises a CPU 17A, a memory unit 17B and a transmission unit 17C. The transmission units 15C and 16C, and the transmission units 16D and 17C are respectively connected with each other.

Figure 3:
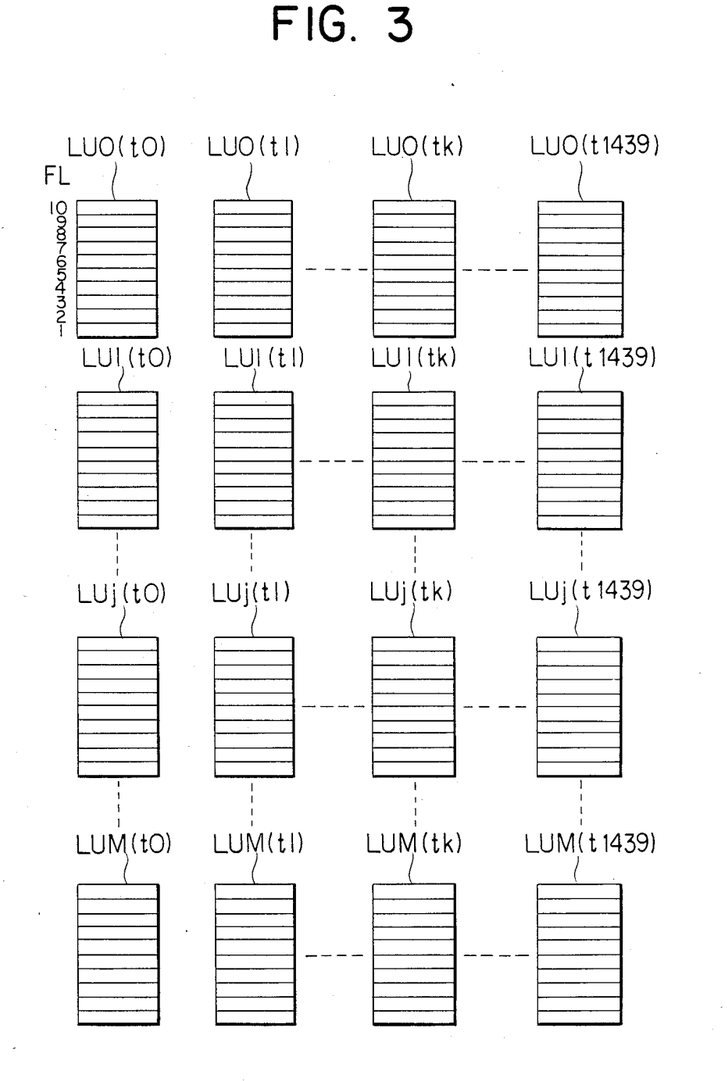
FIG. 3 is a diagram showing the contents (the statistics of up getting-on loads) of the memory unit of a statistics device in FIG. 2.

FIG. 3 is a diagram of the RAM (a part of the memory unit 17B) in which load fluctuations at respective floors on each day are recorded for past M days, and in which getting-on loads in the up direction at the respective floors are written in terms of the rates (in %) relative to the passenger capacity.

In the figure, LUj(t0), LUj(t1), ... and LUj(t1439) are typically expressed by LUj(tk), which indicates the statistics table of the up getting-on loads of the respective floors in the k-th time zone on the past j-th day (where j=0 denotes today, and the same applies hereinbelow). Further, each table is divided into ten sections, which correspond to the respective floors (1st floor–10th floor) of the up getting-on loads. For example, the value of the m-th floor in the statistics table is expressed by LUj(tk)$_m$. In addition, time zone Nos. k are from 0 to 1439, by which a time period of one day is divided into minutes. Accordingly, the statistics tables LUO(t0), LUO(t1), ... and LUO(t1439) correspond to today's loads at different time zones (1440 sections). Likewise, the statistics tables LUl(t0), LUl(t1), ... and LUl(t1439) are those of the up getting-on loads at different time zones on the past first day, and the statistics tables LUM(t0), LUM(t1), ... and LUM(t1439) are those of the up getting-on loads at different time zones on the M-th day. Although not shown, the following statistics tables are also written in the RAM respectively:

LDj(tk) ... Statistics table of down getting-on loads at the respective floors in the k-th time zone on the past j-th day.

PUj(tk) ... Statistics table of up getting-off loads at the respective floors in the same.

PDj(tk) ... Statistics table of down getting-off loads at the respective floors in the same.

Next, the operations of this embodiment will be described with reference to FIGS. 4–9.

First, the operation of taking the statistics of load fluctuations will be explained with reference to a flow chart of the operation of a program (stored in the ROM of the memory unit 17B) in FIG. 4.

At Step 21, time zone No. k corresponding to the current time is set as JH×60+JM on the basis of the time, "hours" JH and "minutes" JM fed from the clock 1 (it is written in correspondence with the address of the RAM of the memory unit 17B, and the same applies to the others). At step 22, scanning cage No. n is made zero to initialize cages. At Step 23, scanning cage No. n is updated to n+1 (cage No. 1). At step 24, it is judged if the scanned cage is at a stop. Unless it is not at a stop, a load fluctuation-processed signal SLn is reset to "0" at Step 25, to make ready for the next load fluctuation. The load fluctuation-processed signal SLn serves to prevent the load of the same cage from being added many times in the subsequent calculation cycles. If the scanned cage is at a stop, whether or not the load fluctuation-processed signal SLn is "0" is judged at Step 26. Unless the load fluctuation is not processed, the control flow proceeds to Step 27, which judges if the scanned cage is under a door closing operation. This judgement serves to set the feed timing of the load fluctuation at the time at which the cage ends its service. If the scanned cage is under the door closing operation, a scanning cage position floor m is set at step 28. Step 29 judges whether or not the scanned cage has moved in the up direction. If it has moved up, the cage load decrement (getting-off load) PKn of cage No. 1 is added at Step 30 to the up getting-off load statistics table PUO(tk)$_m$ of the m-th floor in the k-th time zone of today. This decrement is received from the load detector 2 through the conversion unit 15D and the transmission units 15C, 16C and is operated by the group supervisory device 16. The cage load decrement PKn is evaluated as, for example, a value which is obtained in such a way that the minimum load value of the cage during the period of time from the arrival of the cage till the starting of the door closure by the cage is subtracted from the load value of the cage at the arrival thereof. If the scanned cage has moved in the down direction, the cage load decrement PKn of cage No. 1 is added at Step 31 to the down getting-off load statistics table PDO(tk)$_m$ of the m-th floor in the k-th time zone of today. At step 32, whether or not the direction of the scanned cage is ascent is judged. Subject to the ascent, the cage load increment (getting-on load) LKn of cage No. 1 is similarly added at Step 33 to the up getting-on statistics table LUO(tk)$_m$. This increment is evaluated as, for example, a value which is obtained in such a way that the minimum load value of the cage during the waiting thereof with the door opened is subtracted from the load value of the cage at the starting of the door closure by the cage. If the direction of the cage to run is descent, the cage load increment LKn of cage No. 1 is similarly added at Step 34 to the down getting-on load statistics table LDO(tk)$_m$. At Step 35, the load fluctuation-processed signal SLn is set at "1". When it is respectively judged at Step 26 and Step 27 that the load fluctuation has been processed and that the scanned cage is not under the door closing operation, the succeeding steps are not executed and the control flow jumps to Step 36. At Step 36, it is judged if all the cages have been scanned. Unless the scanning has been finished, the control flow returns to Step 23, at which the scanning for cage No. 2 is performed. Likewise, cage No. 3 is scanned. When it is detected at Step 36 that the scanning of all the cages has been finished, the series of processing steps end. Upon lapse of time of every minute, new time zone No. k is set by Step 21, and processing similar to the above is executed again. In this way, as the load fluctuation values of the respective cages on the respective floors at JH hours JM minutes, the cage load decrements PKn and the cage load increments LKn are written into the respectively corresponding areas of the statistics tables PUO(tk), PDO(tk), LUO(tk) and LDO(tk) in the k-th time zone corresponding to JH hours JM minutes. They are written every minute, and when one day has lapsed, all the statistics tables of one row assigned (t0)–(t1439) in FIG. 3 are written.

Figure 5:
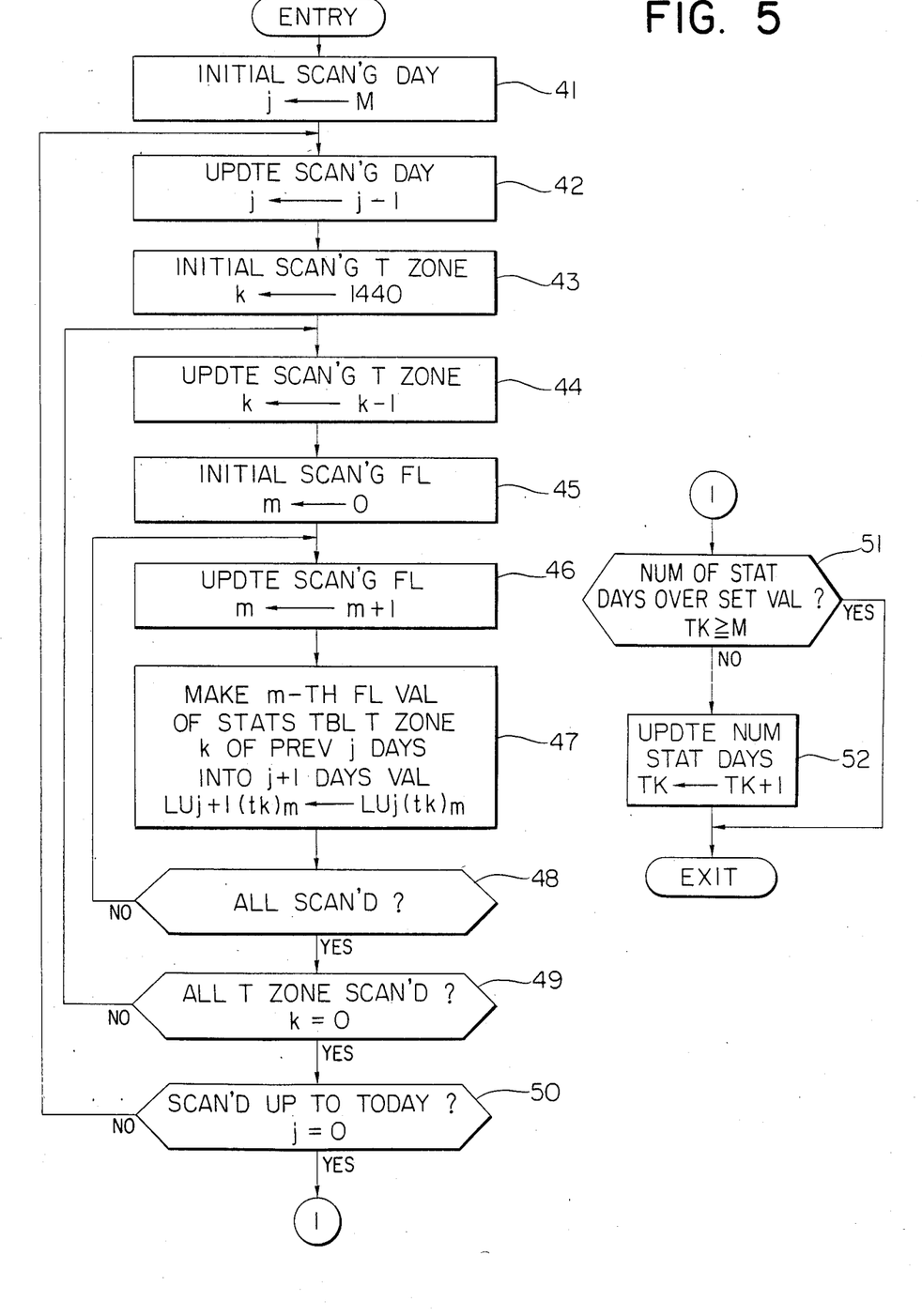
FIG. 5 is a flow chart of the operation of a statistic value transferring program which is executed by the same.

Secondly, the operation of transferring statistic values will be explained with reference to a flow chart of the operation of a program (stored in the ROM of the memory unit 17B) in FIG. 5.

Figure 4:
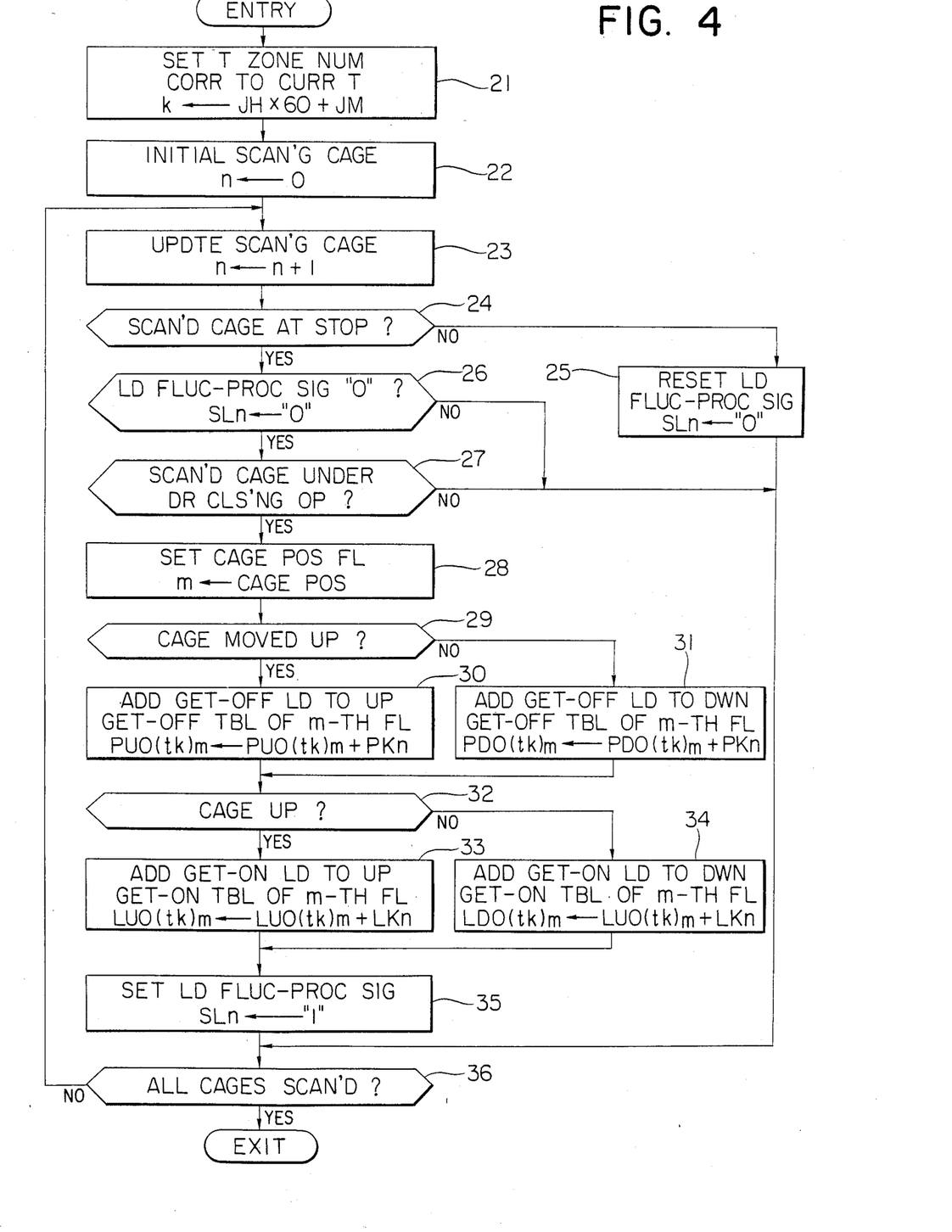
FIG. 4 is a flow chart of the operation of a load fluctuation statistics program which is executed by the statistics device in FIG. 2.

This operation transfers today's load fluctuation statistics tables for the respective floors obtained by the operation of FIG. 4, to the tables of the past M days in FIG. 3. The data items for (M−1) day before are transferred to those M days before, and the data items for one day before are transferred to those two days before. This program is usually processed at zero hour zero minute. In addition, although this is not illustrated, the load fluctuation statistics tables obtained on the particular day are cleared after the program has been run.

At step 41, the scanning day j is initialized to the M-th day. At Step 42, the scanning day j is updated to the (j−1)-th day. This zone No. k is initialized to "1440" (set to be larger by one than 0−1439) at Step 43, whereupon time zone No. k is updated to (k−1) at Step 44. The scanning floor m is initialized to zero at Step 45, and it is updated to (m+1) at Step 46. At Step 47, the value of the up getting-on load statistics table LUj(tk)$_m$ in the k-th time zone on a day preceding by j days is put into the value of the statistics table LUj+1(tk)$_m$ on a day preceding by (j+1) days. Step 48 judges if all the floors have been scanned. Unless the scanning has been finished, the control flow returns to Step 46, and Steps 46 and 47 are repeated. When all the floors have been scanned, the control flow proceeds to Step 49. Step 49 judges if the scanning of all the time zones has been finished. Unless the scanning has been finished, the control flow returns to Step 44, and Steps 44–48 are repeated. When all the time zones have been scanned, the control flow proceeds to Step 50. At Step 50, it is judged if the days up to today have been scanned. Unless the scanning has been finished, the control flow returns to Step 42, and Steps 42–49 are repeated. When the scanning up to today has been finished, the control flow proceeds to Step 51. Step 51 judges if the number of statistic days TK is at least M. If less than M, the number of statistic days TK is updated to (TK+1) at step 52. If the number of statistic days is at least M, the processing of this program ends. That is, Steps 51 and 52 serve to count the number of statistic days TK and to prevent an overflow.

Figure 6:
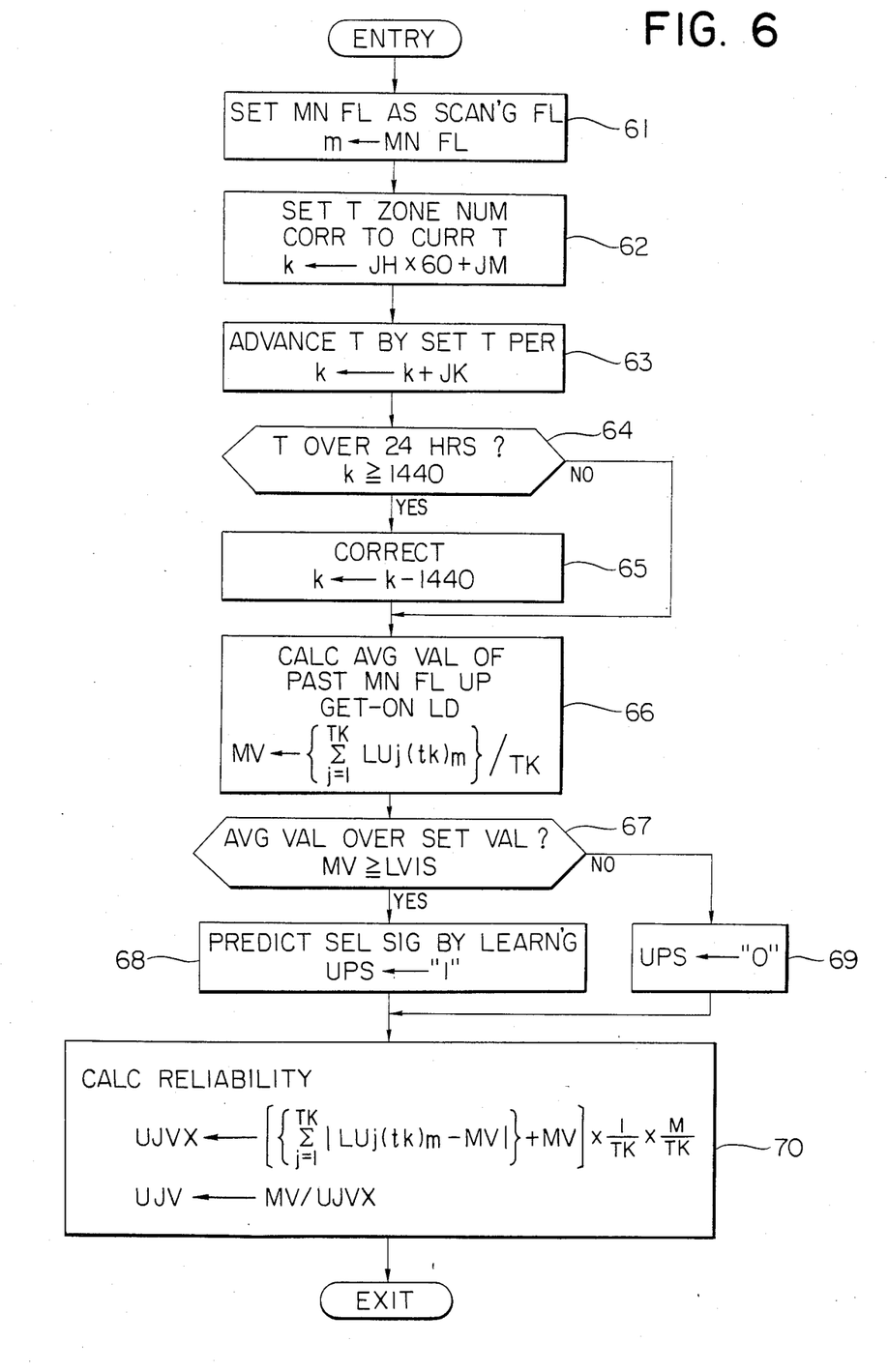
FIG. 6 is a flow chart of the operation of a program for calculating a predictive time for selecting an office-going hour operation and also calculating the reliability thereof, the program being executed by the same.

Next, the operation of calculating a predictive time for selecting an office-going hour operation and also calculating the reliability thereof will be explained with reference to a flow chart of the operation of a program (stored in the ROM of the memory unit 17b) in FIG. 6.

According to this operation, the time for selecting the office-going hour operation is predicted from statistical results, further, the degree to which the predicted selecting time is reliable is found to be higher as the dispersion of the past data is lower. That is, it is predictively determined that the current time is the time at which the pattern may be selected, and the reliability is simultaneously calculated.

At Step 61, the scanning floor m is set at a main floor. At Step 62, time zone No. k corresponding to the current time is set as JH×60+JM. At Step 63, in order to predict traffic at a predetermined time ahead of the current time, a fixed period of time (advanced period of time) JK is added to time zone No. k. This is intended to select the pattern earlier, thereby making it possible to cope with the future traffic without delay. Step 64 judges if the time put forward by the fixed period of time JK is at least 24 hours (namely, 1440 in terms of time zone No. k). If the advanced time is at least 24 hours, 1440 is subtracted therefrom for correction at Step 65. If the advanced time is less than 24 hours, the control flow proceeds to Step 66. At Step 66, the mean value MV of the up getting-on load values LUj(tk)$_m$ at the main floor in the past corresponding to time zone No. k with the fixed perod of time JK put forward from the current time is calculated by the following equation:

$$MV = \left\{ \sum_{j=1}^{TK} LUj(tk)_m \right\} / TK$$

where TK: the number of statistic days. At step 67, whether or not the mean value MV is at least a predetermined value LVIS (for example, 70% of the passenger capacity) is judged. If it is at least the predetermined value, a predictive selection signal UPS for the office-going hour operation based on learning is set at "1" by Step 68, whereas if it is less than the predetermined value, the predicted selection signal UPS is set at "0" by Step 69. At Step 70, the reliability UJV of the predicted selection signal UPS is calculated at Step 70 in accordance with the following equations:

$$UJVX = \left[ \left\{ \sum_{j=1}^{TK} |LUj(tk)_m - MV| \right\} + MV \right] \times \frac{1}{TK} \times \frac{M}{TK}$$

$$UJV = \frac{MV}{UJVX}$$

where UJVX: the degree which indicates the inverse number of the reliability UJV. That is, the reliability UJV is deemed to be higher as the dispersion is lower. M/TK is multiplied in order to enhance the reliability more as the number of statistic days TK is larger.

The respective signals UPS and UJV thus obtained are transmitted from the statistics device 17 and received into the group supervisory device 16 every operating cycle of the program (for example, 1 second). A load in the cage and a cage state are similarly transmitted from the cage control device 15 to the group supervisory device 16 and further to the statistics device 17. In addition, hall calls and the current time are transmitted from the group supervisory device 16 to the statistics device 17.

Next, the operation of selecting the office-going hour mode will be explained with reference to a flow chart of the operation of a program (stored in the memory unit 16B) in FIGS. 7–9.

At Step 71, it is judged if the statistics device 17 is out of order. When the statistics device is in good order, it is judged at Step 72 if the reliability UJV is as high as at least a first predetermined value VK1 (for example, "1"). When the reliability UJV is as high as at least the first predetermined value VK1, it is judged at Step 73 if it is as high as at least a second predetermined value VK2 (for example, "4"). When it is less than the second predetermined value VK2, reference values S and E for selecting and releasing the pattern are respectively set at "2" by Step 74 in advance. When the reliability is at least the second predetermined value VK2, it is further judged at Step 75 if it is as high as at least a third predetermined value VK3 (for example, "7"). When it is less than the third predetermined value VK3, the reference values S and E are respectively set at "1" by Step 76 in advance. When it is at least the third predetermined value VK3, the reference values S and E are respectively set at "0" by step 77. Even in a case where it has been judged at Step 71 that the statistics device 17 is out of order or it has been judged at Step 72 that the reliability UJV is less than the first predetermined value VK1, the predicted selection signal UPS is always rendered "1" by Step 78 in order to permit the pattern selection, whereupon the reference values S and E are set at "3"

as the lowest reliability by Step 79. Thus, the reference values S and E conforming with the reliability UJV have been obtained as follows:

| Reference Values S, E | Reliability UJV |
|---|---|
| 0 | At least the third predetermined value VK3 (Unconditional) |
| 1 | At least the second predetermined value VK2, but less than the third predetermined value VK3 (Reliability 2) |
| 2 | At least the first predetermined value VK1, but less than the second predetermined value VK2 (Reliability 1) |
| 3 | Less than the first predetermined value VK1 (Quite unreliable) |

The sections of the reliability are not restrictive.

Subsequently, Step 80 judges if the current time is at or after the starting time USJK of an office-going time zone and before the end time UEJK of the office-going time zone, namely, if it is within the office-going time zone. Subject to the office-going time zone, Step 81 judges if the predicted selection signal UPS for the office-going hour operation based on learning is "1". When the predicted selection signal UPS is "1", Step 82 judges if a command signal UP for selecting the office-going hour operation is "1", namely, if the mode of operation is already selected.

Figure 7:
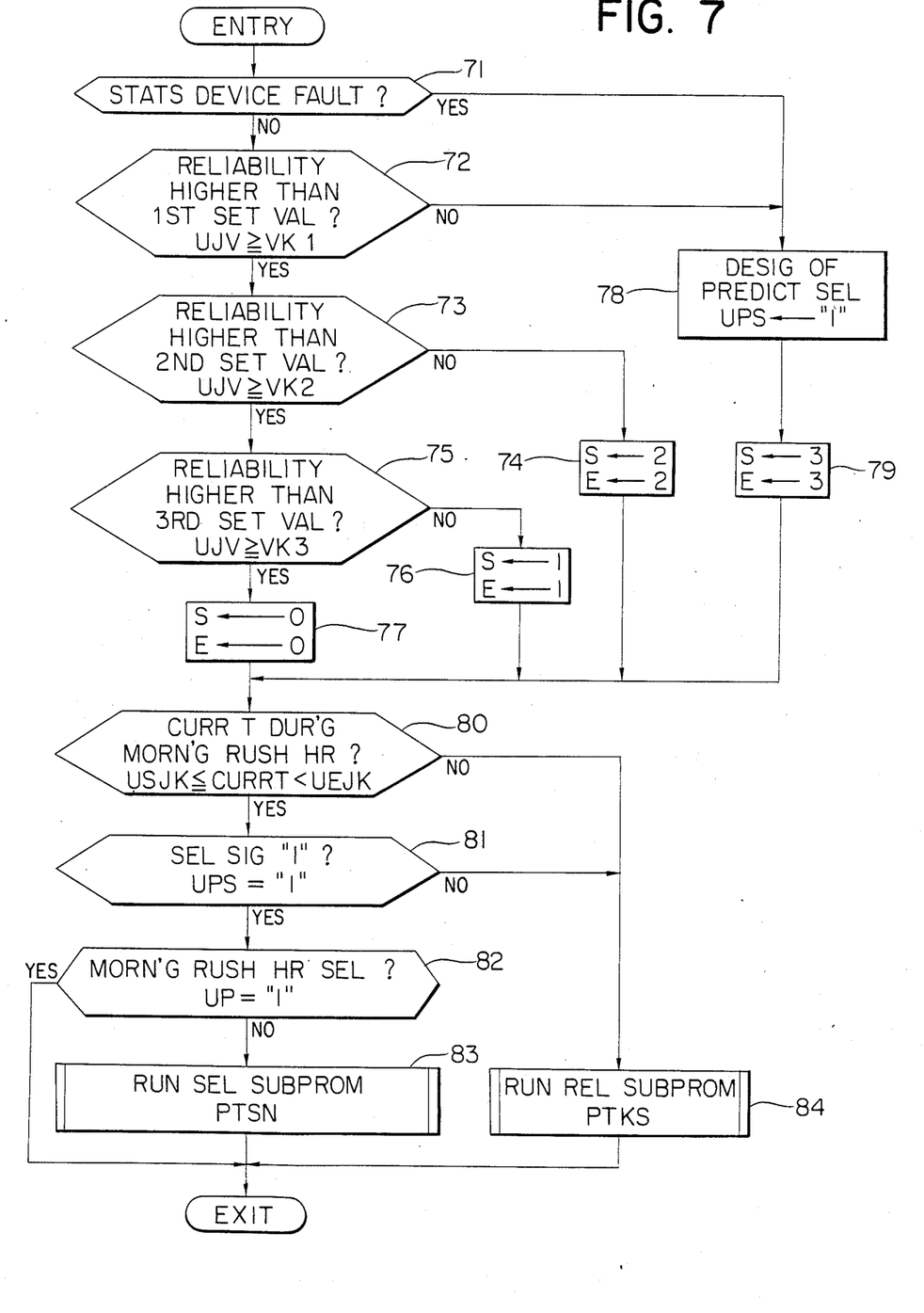
FIGS. 7 to 9 are flow charts of the operation of a program for selecting the office-going hour operation, the program being executed by a group supervisory device in FIG. 2.
Figure 8:
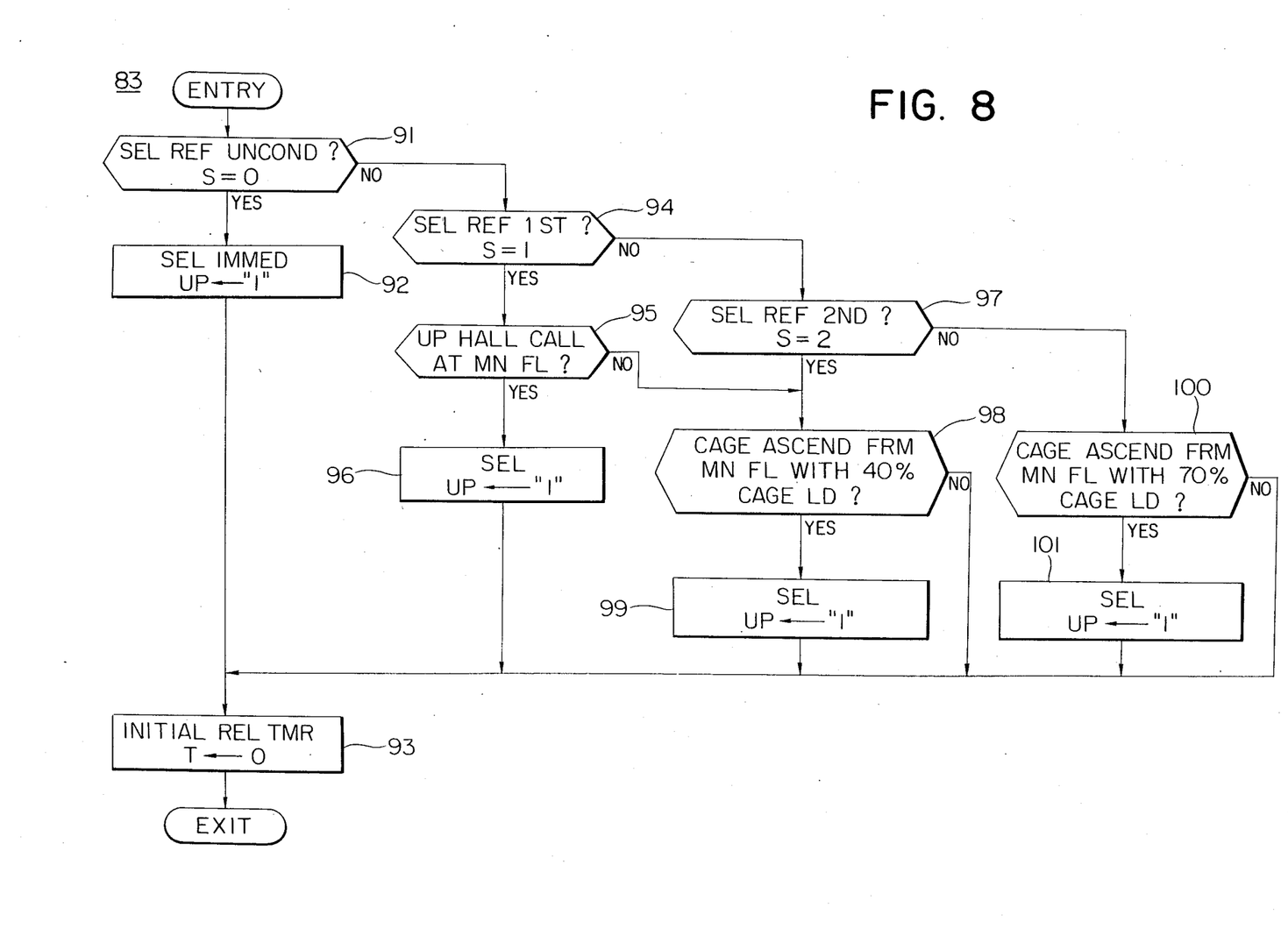
Figure 9:
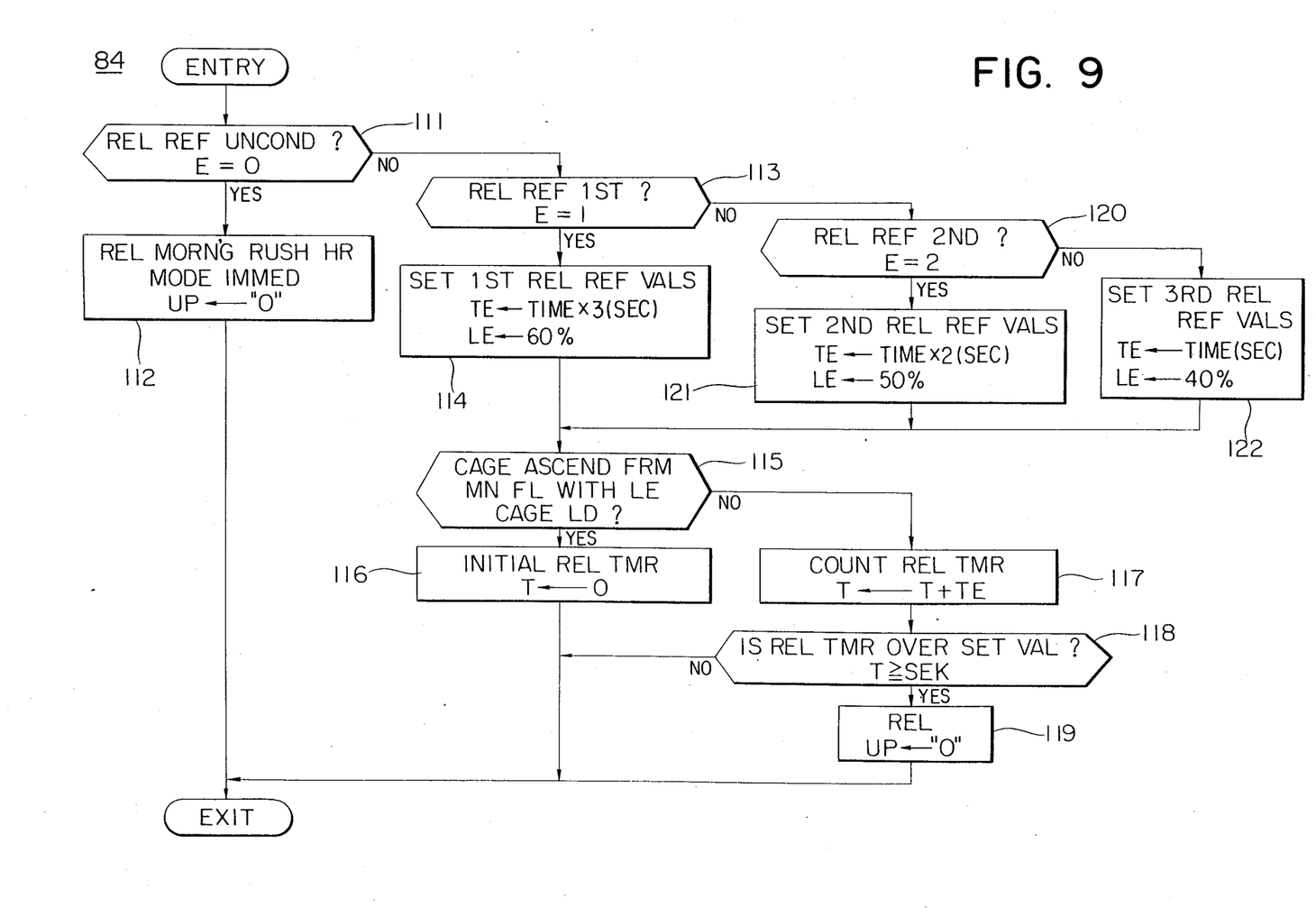

Unless it is selected, a selection subprogram PTSN in FIG. 8 is run at Step 83. In a case where it has been judged at Step 80 that the current time is not within the office-going time zone or at Step 81 that the predicted selection signal UPS is "0", a release subprogram PTKS in FIG. 9 is run at Step 84.

That is, according to the operation of FIG. 7, in the case where the learned predicted selection signal UPS is "1", the office-going hour mode is selected under a lenient condition by the subprogram PTSN if the reliability UJV is high. When the current time falls outside the time zone, or when the predicted selection signal UPS is "0", the office-going mode is released under a lenient condition by the subprogram PTKS if the reliability UJV is high.

Next, the operating procedure of the subprogram PTSN in FIG. 8 will be explained.

At Step 91, whether or not the selection reference value S is 0 (unconditional) is judged. Subject to S=0, the command signal UP for selecting the office-going hour operation is set at "1" by Step 92. That is, the office-going hour mode is immediately selected. At Step 93, a timer T to be used for the release of the office-going hour operation is rendered zero. When S≠0 has been judged at Step 91, whether or not the reference value S is 1 (Reliability 2) is judged at Step 94. Subject to S=1, the presence of a hall call at the main floor is judged at Step 95 in order to permit the selection of the office-going hour mode merely by the occurrence of the hall call. In the presence of the hall call, the selection command signal UP is set at "1" by Step 96. In a case where, when S≠1 has been judged at Step 94, the reference value S is judged to be 2 (Reliability 1) by Step 97 or the absence of the hall call is judged by Step 95, Step 98 judges the presence of a cage which leaves the main floor in the ascent direction with a cage load of at least 40% of the passenger capacity. In the presence of the cage meeting the requisite, Step 99 sets the selection command signal UP at "1". When S≠2 or S=3 (quite unreliable) has been judged at Step 97, Step 100 judges the presence of a cage which leaves the main floor in the ascent direction with a cage load of at least 70% of the passenger capacity. In the presence of the cage meeting the requisite, Step 101 sets the selection command signal UP at "1". In the absence of the cage meeting the requisite at each of steps 98 and 100, the selection command signal UP remains "0", so that the office-going hour operation is not selected. When any of Steps 96, 99 and 101 has set the selection command signal UP at "1", the control flow proceeds to Step 93.

In this manner, as the magnitude of the reference value S is smaller, the office-going hour operation is selected more easily, in other words, more quickly, and it is started earlier.

Next, the operating procedure of the subprogram PTKS in FIG. 9 will be explained.

At Step 111, whether or not the release reference value E is 0 (unconditional) is judged. Subject to E=0, Step 112 sets the selection command signal UP at "0". That is, the office-going hour mode is immediately released. When E≠0 has been judged at Step 111, Step 113 judges if the reference value E is 1 (Reliability 2). Subject to E=1, at Step 114, a value (for example, 3 seconds) which is three times greater than the operating cycle TIME (for example, 1 second) of the program is set as a release reference period of time TE (addition time). Further, 60 (%) is set as a release reference load LE. Step 115 judges the presence of a cage which leaves the main floor in the ascent direction with a cage load of at least the reference load LE. In the presence of the cage meeting the requisite, the traffic is judged to be of the office-going hour mode, and the release time T is rendered zero at Step 116. When Step 115 has judged that only a cage or cages of a cage load less than the reference load LE exist(s), the release reference period of time TE is added to the release timer T at Step 117. At Step 118, whether or not the release timer T is at least a predetermined value SEK (for example, 120 seconds) is judged. If it is at least the predetermined value, the selection command signal UP is set at "0" by Step 119. If it is less than the predetermined value SEK, the office-going hour operation is not released. That is, at Step 115, 116, and 117-119, when no cage satisfies the requisites for the predetermined time interval SEK, the office-going hour operation is released. Besides, when E≠1 has been judged at Step 113, Step 120 judges if the reference value E is 2 (Reliability 1). Subject to E=2, as values for rendering the release conditions severer, a value (for example, 2 seconds) double the operating cycle TIME of the program and 50 (%) are respectively set as the release reference time TE and as the release reference load LED by Step 121. When E≠2 (namely, E=3) has been judged at Step 120, Step 122 sets the operating cycle TIME as the release reference time TE and 40 (%) as the release load LE as values for rendering the release conditions the severest. On either occasion, the control flow proceeds to Step 115.

In this manner, as the magnitude of the reference value E is smaller, the office-going hour operation is selected more easily, in other words, more quickly, and it is ended earlier.

While, in the above embodiment, the office-going hour operation which is one of traffic patterns has been explained, the invention can be similarly performed for other traffic patterns.

Also in a case where the traffic prediction of any other than the traffic pattern, for example, an electric power saving operation or the automatic registration of hall calls is performed on the basis of the learning function, it can be performed similarly to the above embodiment.

As set forth above, according to this invention, in a case where the statistics of the traffic conditions of an elevator are taken and where a future traffic condition is predicted with the statistic result, the reliability of the predictive traffic is calculated, and the traffic condition is predicted in accordance with the reliability so as to supervise the operation of cages, so that a learning function can be demonstrated to the utmost to precisely perform the predicted traffic.

What is claimed is:

1. An elevator supervisory-learning control apparatus for reliably predicting future elevator traffic in accordance with collected traffic conditions of a group of elevators over a predetermined past period of time, said control apparatus comprising:

elevator traffic statistics means for collecting traffic conditions;

means for estimating future traffic pattern values in accordance with a learning function based on detected traffic conditions of the elevators provided by said elevator traffic statistics means, said estimating means including means for generating mean values based on said detected traffic conditions;

reliability-determining means for calculating reliability of the estimated future traffic pattern values on the basis of the learning function and the detected traffic conditions of the elevators, said reliability-determining means including means for evaluating dispersions about the mean values;

means for storing predetermined traffic patterns of the elevators;

means for selecting one of said traffic patterns in accordance with the reliability of the estimated future traffic pattern values from said reliability-determining means; and control means for supervising the operation of said elevators in accordance with the selected traffic pattern.

2. An elevator supervisory-learning control apparatus according to claim 1 further including:

timing means for generating clock signals determining time zones; and sensing means for detecting a plurality of traffic conditions of said elevators and for generating corresponding signals representative thereof for said estimating means.

3. An elevator supervisory-learning control apparatus according to claim 2 wherein said elevator traffic statistics means includes a memory unit for storing the traffic conditions detected by said sensing means every predetermined time zone established by said clock signals from said timing means over the predetermined past period of time.

4. An elevator supervisory-learning control apparatus according to claim 3 wherein said elevator traffic statistics means updates the traffic conditions stored in said memory unit for a preset time period with the traffic conditions over the predetermined period of time.

5. An elevator supervisory-learning control apparatus for reliably predicting future elevator traffic in accordance with collected traffic conditions of a group of elevators over a predetermined past period of time, said control apparatus comprising:

timing means for generating clock signals determining time zones;

sensing means for detecting a plurality of traffic conditions of said elevators and for generating corresponding signals representative thereof;

elevator traffic statistics means providing a learning function for predicting elevator traffic patterns based on collected traffic conditions wherein said elevator traffic statistics means is coupled to said sensing means and includes a memory unit for storing the traffic conditions detected by said sensing means every predetermined time zone established by said clock signals from said timing means over the predetermined past period of time;

means for estimating future traffic pattern values in accordance with the learning function provided by said elevator traffic statistics means based on detected current traffic conditions of the elevators;

reliability-determining means for calculating reliability of the estimated future traffic pattern values on the basis of the learning function and the detected current traffic conditions of the elevators, the reliability of the estimated future traffic pattern values being inversely proportional to a dispersion of the traffic conditions in the predetermined time zones over the predetermined past period of time;

means for storing predetermined values representing a known traffic pattern of the elevators;

means for selecting values from said storing means or from said estimating means for predicting future elevator traffic patterns in accordance with the reliability of the estimated future traffic pattern values from said reliability-determining means; and control means for supervising the operation of said elevators in accordance with the selected future elevator traffic pattern values.

6. An elevator supervisory-learning control apparatus according to claim 5 wherein said reliability calculation means calculates mean values of corresponding traffic conditions in the same time zones over the predetermined past period of time to determine a degree to which values indicative of the traffic conditions of a respective time period disperse from said mean values so as to calculate the reliability of the estimated future traffic pattern values.

7. An elevator supervisory-learning control apparatus according to claim 6 wherein said reliability calculation means evaluates differences between the mean values and the traffic condition values of the respective time period, cumulatively adds the differences to the traffic condition values, and determines the reliability by dividing the resulting sum of the predetermined past period of time.

8. An elevator supervisory-learning control apparatus according to claim 6 wherein the reliability of the estimated future traffic pattern values increases as the predetermined past period of time increases.

9. An elevator supervisory-learning control apparatus according to claim 8 wherein said traffic pattern estimating means selects one of a plurality of preset reference values corresponding to a plurality of reliability levels in accordance with the calculated reliability so as to reliably predict future elevator traffic pattern values.

10. An elevator supervisory-learning control apparatus according to claim 1 wherein said estimating means predicts future traffic pattern values for selecting one of preset traffic patterns.

11. An elevator supervisory-learning control apparatus according to claim 9 wherein said traffic pattern estimating means predicts future traffic pattern values based on values in said storing means when the reliability level of the predicted values is low.

12. An elevator supervisory-learning control apparatus according to claim 11 wherein said traffic pattern estimating means selects a traffic pattern on the basis of collected traffic conditions at a predetermined floor depending upon the reliability levels of the estimated future traffic pattern values.

13. A control apparatus as defined in claim 1 wherein said statistics means includes a memory unit which stores the traffic conditions in each of predetermined time zones on each of respective days over a predetermined number of past days.

14. A control apparatus as defined in claim 13 wherein said statistics means sets the predetermined time zone at 1 minute, and said memory unit stores the traffic conditions every minute.

15. A control apparatus as defined in claim 13 wherein said statistics means causes said memory unit to store an up getting-on load, a down getting-on load, an up getting-off load and a down getting-off load at each hall in each of the time zones on each day.

16. A control apparatus as defined in claim 13 wherein said statistics means causes said memory unit to store the traffic conditions when an elevator is at a stop and is under a door closing operation.

17. A control apparatus as defined in claim 13 wherein said statistics means updates the stored traffic conditions in said memory unit every day in order to store the traffic conditions over the newest predetermined number of past days.

18. A control apparatus as defined in claim 13 wherein said reliability-determining means judges the reliability to be higher as a dispersion of the traffic conditions in the same time zones among the traffic conditions of the respective days stored by the memory means as lower.

19. A control apparatus as defined in claim 18 wherein said estimating means calculates a mean value of the traffic conditions in the same time zones among the traffic conditions of the respective days stored by said memory means and said reliability-determining means judges a degree to which values indicative of the traffic conditions of the respective days in the same time zones disperse with reference to the mean value in calculating the reliability.

20. An elevator supervisory-learning control apparatus for reliably predicting future elevator traffic in accordance with collected traffic conditions of a group of elevators over a predetermined past period of time, said control apparatus comprising:

elevator traffic statistics means providing a learning function for predicting elevator traffic patterns based on collected traffic conditions, said statistics means including a memory unit which stores the traffic conditions in each of predetermined time zones on each of respective days over a predetermined number of past days;

means for estimating future traffic pattern values in accordance with the learning function provided by said elevator traffic statistics means based on detected current traffic conditions of the elevators;

reliability-determining means for calclating reliability of the estimated future traffic pattern values on the basis of the learning function and the detected current traffic conditions of the elevators wherein said reliability-determining means judges the reliability to be higher as a dispersion of the traffic conditions in the same time zones among the traffic conditions of the respective days stored by the memory means is lower, wherein said reliability-determining means calculates a mean value of the traffic conditions in the same time zones among the traffic conditions of the respective days stored by said memory means and judges a degree to which value is indicative of the traffic conditions of the respective days in the same time zones dispersed with reference to the mean value and calculating the reliability, and wherein said reliability-determining means evaluates differences between the mean value and the traffic condition values of the respective days and cumulatively adds the differences, judges the reliability on the basis of a value obtained by dividing the resulting sum by the predetermined number of past days and calculates a value which expresses a higher reliability when smaller;

means for storing predetermined values representing a known traffic pattern of the elevators;

means for selecting values from said storing means or from said estimating means for predicting future elevator traffic patterns in accordance with the reliability of the estimated future traffic pattern values from said reliability-determining means; and control means for supervising the operation of said elevators in accordance with the selected future elevator traffic pattern values.

21. An elevator supervisory-learning control apparatus for reliably predicting future elevator traffic in accordance with collected traffic conditions of a group of elevators over a predetermined past period of time, said control apparatus comprising:

elevator traffic statistics means providing a learning function for predicting elevator traffic patterns based on collected traffic conditions, said statistics means including a memory unit which stores the traffic conditions in each of predetermined time zones on each of respective days over a predetermined number of past days;

means for estimating future traffic pattern values in accordance with the learning function provided by said elevator traffic statistics means based on detected current traffic conditions of the elevators;

reliability-determining means for calculating reliability of the estimated future traffic pattern values on the basis of the learning function and the detected current traffic conditions of the elevators wherein said reliability-determining means judges the reliability to be higher as a dispersion of the traffic conditions in the same time zones among the traffic conditions of the respective days stored by the memory means is lower, wherein said reliability-determining means calculates a mean value of the traffic conditions in the same time zones among the traffic conditions of the respective days stored by said memory means and judges a degree to which values indicative of the traffic conditions of the respective days in the same time zones disperse with reference to the mean value in calculating the reliability, and wherein said reliability-determining means calculates a value which expresses a higher reliability as the predetermined number of past days for the statistics is larger;

means for storing predetermined values representing a known traffic pattern of the elevators;

means for selecting values from said storing means or from said estimating means for predicting future elevator traffic patterns in accordance with the reliability of the estimated future traffic pattern values from said reliability-determining means; and control means for spervising the operation of said elevators in accordance with the selected future elevator traffic pattern values.

22. A control apparatus as defined in claim 21 wherein said traffic pattern estimating means selects one of a plurality of preset reference values for operation supervision of a plurality of elevators in accordance with the given reliability and predicts the traffic pattern values on the basis of the selected reference value.

23. A control apparatus as defined in claim 1 wherein said selecting means includes means for selecting a traffic pattern more quickly for a high reliability of the estimated traffic pattern value and means for releasing a traffic pattern more quickly for a high reliability of the estimated traffic pattern value.

24. A control apparatus as defined in claim 1 wherein when said elevator traffic statistics means is out of order or when the reliability of the estimated future traffic pattern value is low, said selecting means selects the traffic pattern without employing the estimated traffic pattern values.

25. A control apparatus as defined in claim 24 wherein when the reliability is low, said selecting means selects a traffic pattern on the basis of calls of a predetermined floor, and when the reliability is still lower, said selecting means selects a traffic pattern on the basis of a traffic condition of an elevator at a predetermined floor.

26. A control apparatus as defined in claim 24 wherein when the reliability is low, said selecting means releases a traffic pattern on the basis of the traffic conditions of an elevator.

* * * * *